US008712242B2

(12) United States Patent
Zhang et al.

(10) Patent No.: US 8,712,242 B2
(45) Date of Patent: Apr. 29, 2014

(54) RANGING METHOD AND APPARATUS IN PASSIVE OPTICAL NETWORK

(75) Inventors: Weiliang Zhang, Shenzhen (CN); Dan Geng, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 123 days.

(21) Appl. No.: 13/384,746

(22) PCT Filed: Nov. 19, 2010

(86) PCT No.: PCT/CN2010/078919
§ 371 (c)(1),
(2), (4) Date: Jan. 18, 2012

(87) PCT Pub. No.: WO2011/060734
PCT Pub. Date: May 26, 2011

(65) Prior Publication Data
US 2012/0121253 A1     May 17, 2012

(30) Foreign Application Priority Data
Nov. 23, 2009   (CN) .......................... 2009 1 0222636

(51) Int. Cl.
*H04J 14/00*     (2006.01)
(52) U.S. Cl.
USPC .............................................. 398/67; 398/66
(58) Field of Classification Search
USPC .................. 398/58, 59–72, 102, 161, 98, 100
See application file for complete search history.

(56) References Cited

U.S. PATENT DOCUMENTS

| 7,369,768 | B2 * | 5/2008 | Sakamoto et al. ............... 398/58 |
| 7,382,739 | B2 * | 6/2008 | Kramer ......................... 370/254 |
| 7,512,341 | B2 * | 3/2009 | Kazawa et al. ................. 398/71 |
| 7,881,609 | B2 * | 2/2011 | Eguchi .......................... 398/25 |

(Continued)

FOREIGN PATENT DOCUMENTS

| CN | 1383276 | 12/2002 |
| CN | 1388658 | 1/2003 |
| GB | 2349549 | 11/2000 |

OTHER PUBLICATIONS

ITU-T G.984.3, Gigabit-capable Passive Optical Networks (G-PON): Transmission convergance layer specification, Mar. 2008, Series G: Tranmission Systems and Media, Digital Systems and Networks, pp. 64-91.*

(Continued)

*Primary Examiner* — Ken Vanderpuye
*Assistant Examiner* — Dibson Sanchez
(74) *Attorney, Agent, or Firm* — Kunzler Law Group

(57) ABSTRACT

The present invention discloses a method for ranging in a passive optical network, and the method includes: obtaining a Round Trip Delay (RTD) between an Optical Line Terminal (OLT) and an Optical Network Unit (ONU); and opening a quiet window used for the ranging for the ONU according to the RTD to perform the ranging on this ONU. The present invention further discloses an apparatus for ranging in a passive optical network, and the apparatus includes: an obtainment module which is configured to: obtain a RTD between an OLT and an ONU; and a ranging module configured to: open a quiet window used for ranging for the ONU to perform ranging on the ONU according to the RTD. The present invention shortens the open time of the quiet window used for the ranging and improves the efficiency of the upstream transmission, and the implementation method is simple and convenient.

14 Claims, 4 Drawing Sheets

(56) References Cited

U.S. PATENT DOCUMENTS

| | | | |
|---|---|---|---|
| 7,936,991 B2* | 5/2011 | Sugawara et al. | 398/67 |
| 7,957,647 B2* | 6/2011 | Kazawa et al. | 398/75 |
| 8,005,362 B2* | 8/2011 | Sakamoto et al. | 398/67 |
| 8,180,218 B2* | 5/2012 | Murata | 398/40 |
| 8,391,715 B2* | 3/2013 | Niibe et al. | 398/71 |
| 8,509,619 B2* | 8/2013 | Mukai et al. | 398/66 |
| 8,542,994 B2* | 9/2013 | Murata | 398/43 |
| 2005/0047782 A1* | 3/2005 | Davis et al. | 398/58 |
| 2007/0237189 A1* | 10/2007 | Miguel et al. | 370/907 |
| 2007/0264016 A1* | 11/2007 | DeLew | 398/71 |
| 2009/0067850 A1* | 3/2009 | Mizutani et al. | 398/154 |
| 2009/0263132 A1* | 10/2009 | Rafel et al. | 398/66 |
| 2010/0040371 A1* | 2/2010 | Wu et al. | 398/58 |
| 2011/0317998 A1* | 12/2011 | Fujimura | 398/25 |

OTHER PUBLICATIONS

PCT/CN2010/078919, International Search Report, Mar. 3, 2011.

* cited by examiner

US 8,712,242 B2

RANGING METHOD AND APPARATUS IN PASSIVE OPTICAL NETWORK

FIELD OF THE INVENTION

The present invention relates to the communication field, and specifically, to a method and an apparatus for ranging in a passive optical network.

BACKGROUND

The Gigabit Passive Optical Network (GPON) is an important technical branch of the Passive Optical Network (PON) family, and similar to the other PON techniques, the GPON is also a passive optical access technique using a topology structure of point to multipoint.

The topology structure of the GPON system is as shown in FIG. 1, wherein the GPON is composed by an Optical Line Terminal (OLT) at the central office side, an Optical Network Unit (ONU) at the subscriber side, and an Optical Distribution Network (ODN), and generally uses the network structure of point to multipoint. The ODN is composed by passive optical components, such as single mode fibers, one or more optical splitters and optical connectors, and the like, to provide an optical transmission medium for the physical connection between the OLT and the ONU.

In the GPON system, the data transmission in downstream (from the OLT to the ONU) adopts the way of broadcast. Each ONU receives all of the downstream frames in the network, and then obtains the frame belonging to the ONU according to the ONU Identity (ONU-ID), GPON Encapsulated Method-Port Identity (GEM-Port ID), and Allocation Identity (Allocation-ID). However, for the data transmission in the upstream (from the ONU to the OLT), since various ONUs should share the transmission medium, various ONUs should transmit the upstream data within the slot allocated for this ONU. Since the distances between various ONUs and the OLT are different, in order to avoid that the upstream data sent by the various ONU arrives at the OLT at the same time, the OLT needs to perform ranging on each ONU and send the equalization delay obtained according to the ranging result to the corresponding ONU. The ONU adjusts the clock used for sending the data according to the equalization delay sent by the OLT, that is to say, when the ONU is intend to send the upstream frame, the ONU needs to send the upstream frame after delaying own equalization delay, thereby implementing the synchronization of all of the ONU upstream transmission.

The ONU has 7 states, which are respectively an initial state, a standby state, a serial number state, a ranging state, an operation state, a POPUP state and an emergency stop state. In the related art, the OLT performs ranging on the ONU that is in the ranging state, which mainly comprises following steps of: the OLT sending a ranging request to the ONU and opening a quiet window, and configuring the open time of the quiet window. During the open time of the quiet window, the ONUs that are in the operation state all do not send the upstream data, so as to avoid the conflict with the message sent by the ONU that is in the ranging state; the ONU which receives the ranging request sends the own serial number information to the OLT; the OLT performs ranging on the ONU, and sends the ranging result to the ONU by the Ranging-time message; the ONU receives the Ranging-time message and then gets into the operation state and implements the synchronization of the upstream transmission. Since the OLT does not know the position of the ONU on which ranging is to be performed, the OLT opens the quiet window for the ONU on which ranging is to be performed according to the nearest distance to the ONU and the furthest distance to the ONU that the OLT supports. However, too long open time of the quiet window used for the ranging will interrupt the normal service of the ONU that is in the operation state, thereby affecting the efficiency of the upstream transmission.

SUMMARY

The present invention provides a method and an apparatus for ranging in the passive optical network, which are able to shorten the open time of the quiet window used for the ranging.

In order to achieve the above object, the present invention provides the following technical scheme.

A method for ranging in the passive optical network comprises:

obtaining a Round Trip Delay (RTD) between an Optical Line Terminal (OLT) and an Optical Network Unit (ONU); and opening a quiet window used for the ranging for the ONU according to the RTD to perform the ranging on this ONU.

The step of obtaining the RTD between the OLT and the ONU comprises:

when the ONU is in a serial number state, sending a serial number request message to the ONU that is in the serial number state, and recording a sending time of the serial number request message;

receiving a serial number response message sent by the ONU that is in the serial number state, the serial number response message including random delay information of the ONU, and recording a receiving time of the serial number response message; and obtaining the RTD of a round trip between the OLT and the ONU according to the sending time of the serial number request message, the receiving time of the serial number response message, a random delay of the ONU, and a pre-assigned delay and a start time that are assigned by the OLT for the ONU responding to the serial number request.

The step of opening the quiet window used for the ranging for the ONU according to the RTD to perform the ranging on this ONU comprises:

determining a required period T during performing the ranging on the ONU according to the RTD;

obtaining an open time of the quiet window according to the determined required period T during performing the ranging on the ONU and a preset adjustment time $\Delta t$;

when the ONU is in a ranging state, sending a ranging request to the ONU that is in the ranging state, and opening the quiet window used for performing the ranging on the ONU simultaneously, wherein the quiet window includes the open time of the quiet window;

receiving a ranging response within the open time of the quiet window; and obtaining an Equalization Delay (EqD) of the ONU that is in the ranging state and sending the EqD to the ONU that is in the ranging state.

The determined required period T during performing ranging on the ONU is a sum of the round trip delay and one or more of following delays: a pre-assigned delay when the ONU that is in the ranging state responds to the ranging request and a start time of sending the ranging response.

The method further comprises:

when the ranging on the ONU is successful, reducing a value of the adjustment time $\Delta t$; when the ranging on the ONU is failed, increasing the value of the adjustment time $\Delta t$.

An apparatus for ranging in a passive optical network comprises:

an obtainment module, which is configured to: obtain a Round Trip Delay (RTD) between an Optical Line Terminal (OLT) and an Optical Network Unit (ONU); and a ranging module, which is configured to: open a quiet window used for ranging for the ONU according to the RTD to perform ranging on this ONU.

The obtainment module comprises:

a first obtainment element, which is configured to: send a serial number request message to the ONU that is in a serial number state when the ONU is in the serial number state, and record a sending time of the serial number request message;

a second obtainment element, which is configured to: receive a serial number response message, including random delay information of the ONU, sent by the ONU that is in the serial number state, and record a receiving time of the serial number response message; and a third obtainment element, which is configured to: obtain the RTD of a round trip between the OLT and the ONU according to the sending time of the serial number request message, the receiving time of the serial number response message, a random delay of the ONU, and a pre-assigned delay and a start time that are assigned by the OLT for the ONU responding to the serial number request.

The ranging module comprises:

a determination element, which is configured to: determine a required period T during performing ranging on the ONU according to the RTD;

an obtainment element, which is configured to: obtain an open time of the quiet window according to the determined required period T during performing ranging on the ONU and a preset adjustment time $\Delta t$;

a first processing element, which is configured to: send a ranging request to the ONU that is in a ranging state when the ONU is in the ranging state, and open the quiet window used for performing ranging on the ONU at the same time, wherein the quiet window includes the open time of the quiet window;

a reception element, which is configured to: receive a ranging response within the open time of the quiet window; and a second processing element, which is configured to: obtain an Equalization Delay (EqD) of the ONU that is in the ranging state and send the EqD to the ONU that is in the ranging state.

The determined required period T during performing ranging on the ONU is a sum of the round trip delay and one or more of following delays: a pre-assigned delay when the ONU that is in the ranging state responds to the ranging request and a start time of sending the ranging response.

The ranging module further comprises:

an adjustment element, which is configured to: reduce a value of the adjustment time $\Delta t$ when the ranging on the ONU is successful; increase the value of the adjustment time $\Delta t$ when the ranging on the ONU is failed.

In the technical scheme provided by the present invention, the round trip delay between the OLT and the ONU is obtained, and a quiet window used for ranging is opened for the ONU according to the round trip delay to perform ranging on this ONU, thereby shortening the open time of the quiet window used for ranging and improving the efficiency of the upstream transmission. An existing message transmission mechanism is used to obtain the round trip delay of the round trip between the OLT and the ONU, and the implementation method is simple and convenient.

DETAILED DESCRIPTION

The technical scheme provided by the embodiment of the present invention is further described in combination with the drawings. It should be noted that the features in the embodiments and the embodiments in the present invention may combines with each other without conflicts.

Figures 1, 2, 3:
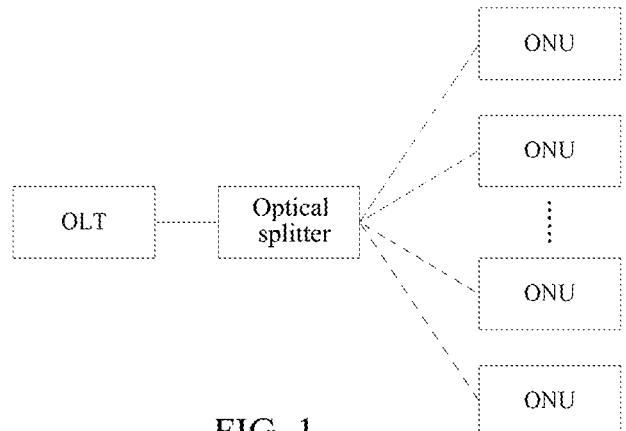
FIG. 1 is a schematic diagram of structure of the passive optical network in the related art.
FIG. 2 is a flowchart of the method for rouging in the passive optical network provided by the present invention.
FIG. 3 is a flowchart of the method of step 201 in the embodiment shown in FIG. 2.

As shown in FIG. 2, the process of the OLT in the passive optical network performing ranging on the ONU that is in the activation state is as follows.

Step 201: the OLT obtains the round trip delay of the round trip between the OLT and the ONU.

In this step, the OLT obtains the round trip delay by, but not limited to, sending a serial number request; for the ONU in the activation state, all of the messages and/or the bandwidth allocation between the OLT and the ONU are also applicable for obtaining the round trip delay, which will be not repeated herein.

The method for obtaining the round trip delay by the way of the OLT sending the serial number request is shown in FIG. 3, which specifically comprises steps 2011~2014.

Step 2011: when the ONU is in a serial number state, the OLT sends the serial number request to the ONU that is in the serial number state and records the sending time T1 of the serial number request.

Step 2012: the ONU in the serial number state sends a serial number response message, including random delay information t and the own serial number information, to the OLT after multiple delays.

Step 2012 specifically comprises: after receiving the serial number request message, obtaining the local serial number information after a pre-assigned delay (Pre-assigned Delay) and a random delay t, and sending a serial number response message to the OLT after a start time (StartTime);

wherein the Pre-assigned Delay is a waiting delay when the ONU is processing the serial number request, and is pre-assigned by the OLT.

Step 2013: the OLT receives the serial number response message which includes the random delay information t of the ONU and records the receiving time T2 of the serial number response message.

Step 2014: the OLT obtains the round trip delay (RTD) between the OLT and the ONU according to the sending time T1 of the serial number request message, the receiving time T2 of the serial number response message and the random delay t of the ONU, i.e., RTD=T2-T1-t-Pre-assigned Delay-StartTime.

It should be noted that the present invention obtains the round trip delay based on, but not limited to, the above-mentioned parameters, and the round trip delay may also be obtained by adding other parameters or reducing the above-mentioned parameters on the basis of the parameters provided by the present invention.

Step 202 is performed after obtaining the round trip delay (RTD) between the OLT and the ONU.

Step 202: the OLT opens a quiet window used for ranging according to the round trip delay to perform ranging on this ONU.

Figure 4:
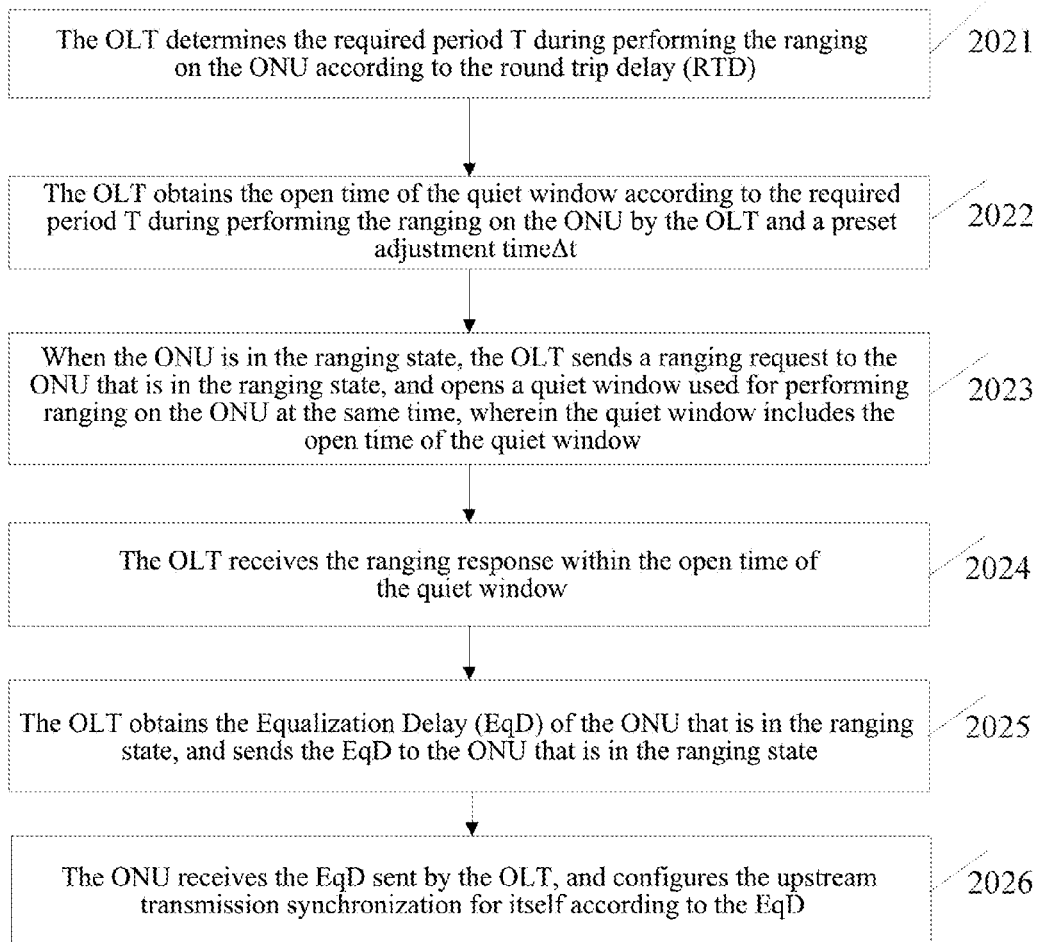
FIG. 4 is a flowchart of the method of step 202 in the embodiment shown in FIG. 2.

Step 202 specifically comprises steps 2021~2023, as shown in FIG. 4.

Step 2021: the OLT determines the required period T during performing the ranging on the ONU according to the round trip delay RTD;

wherein the required period T during the OLT performing the ranging on the ONU includes the required time during which the ranging request is received by the ONU and the required time during which the ranging response is received by the OLT.

The required period T during the OLT performing ranging on the ONU is obtained according to the following parameters including:

a round trip delay RTD, a pre-assigned delay when the ONU responds to the ranging request and that is preset by the OLT, and a start time of the ONU sending the message used for responding to the ranging request.

It should be noted that the present invention obtains the required period T during the OLT performing ranging on the ONU according to, but not limited to, the round trip delay and the above-mentioned parameters, and the required period T during the OLT performing ranging on the ONU may also be obtained by adding other parameters or reducing the above-mentioned parameters on the basis of the parameters provided by the present invention.

Step 2022: the OLT obtains the open time of the quiet window according to the required period T during the OLT performing ranging on the ONU and the preset adjustment time $\Delta t$;

wherein the open time of the quiet window is in the period form the $T-\Delta t$ to the $T+\Delta t$ after sending the ranging request.

The constant $\Delta t$ is the adjustment time, and the value of the $\Delta t$ is determined by the OLT. The values of the $\Delta t$ in multiple times at which the OLT performs ranging on the ONU may be the same or different.

Step 2023: when the ONU is in a ranging state, the OLT sends a ranging request to the ONU that is in the ranging state, and opens a quiet window used for performing the ranging on the ONU at the same time, wherein the quiet window includes the open time of the quiet window.

In this step, the open time of the quiet window is obtained according to the round trip delay between the ONU and the OLT, which could be understood as the open time is obtained according to the logical distance between the ONU and the OLT. Comparing with the way of which the open time is obtained according to the nearest and furthest distances to the ONU that the OLT supports in the related art, the open time of the quiet window is shortened.

Step 2024: the OLT receives the ranging response within the open time of the quiet window.

Step 2025: the OLT obtains the equalization delay (EqD) of the ONU that is in the ranging state, and sends the EqD to the ONU that is in the ranging state.

Step 2026: the ONU receives the EqD sent by the OLT, and configures the upstream transmission synchronization for the ONU itself according to the EqD.

It should be noted that the value of the adjustment time $\Delta t$ may be decreased optionally if the ranging on the ONU is successful; the value of the adjustment time $\Delta t$ may be increased optionally if the ranging on the ONU is failed and the ranging is re-performed on ONU after increasing the value of the adjustment time $\Delta t$.

In the technical scheme provided by the present invention, the round trip delay between the OLT and the ONU is obtained, and a quiet window used for ranging is opened for the ONU according to the round trip delay to perform ranging on this ONU, thereby shortening the open time of the quiet window used for ranging and improving the efficiency of the upstream transmission. An existing message transmission mechanism is used to obtain the round trip delay of the round trip between the OLT and the ONU, and the implementation method is simple and convenient.

Figure 5:
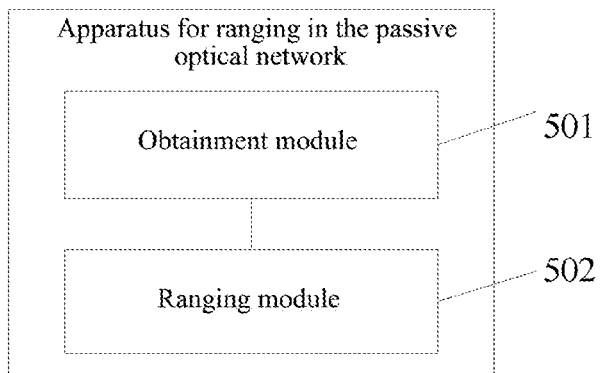
FIG. 5 is a schematic diagram of the structure of an apparatus for ranging in the passive optical network provided by the present invention.

As shown in FIG. 5, an apparatus for ranging in the passive optical network is provided by the present invention, and the apparatus comprises:

an obtainment module 501, which is configured to: obtain the round trip delay between the Optical Line Terminal (OLT) and the Optical Network Unit (ONU); and a ranging module 502, which is configured to: open a quiet window used for ranging according to the RTD to perform ranging on this ONU.

Figure 6:
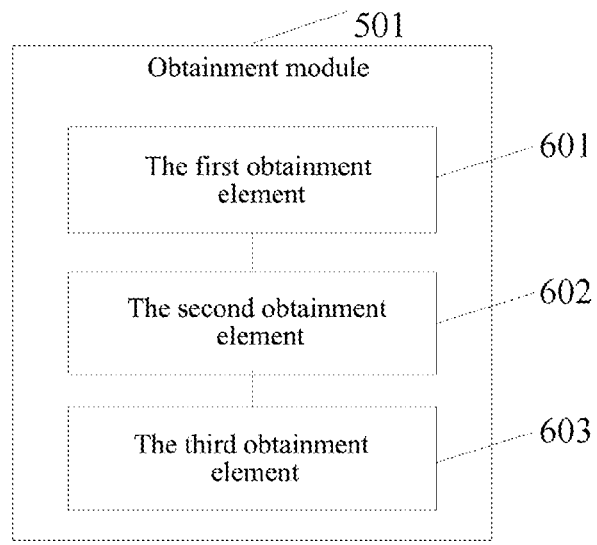
FIG. 6 is a schematic diagram of the structure of the obtainment module 501 in the embodiment shown in FIG. 5.

Preferably, as shown in FIG. 6, the obtainment module 501 may comprise:

the first obtainment element 601, which is configured to: send a serial number request message to the ONU that is in the serial number state when the ONU is in the serial number state, and record the sending time of the serial number request message;

the second obtainment element 602, which is configured to: receive the serial number response message including the random delay information of the ONU sent by the ONU that is in the serial number state, and record the receiving time of the serial number response message; and the third obtainment element 603, which is configured to: obtain the RTD of the round trip between the OLT and the ONU according to the sending time of the serial number request message, the receiving time of the serial number response message, the random delay of the ONU and the pre-assigned delay and start time that are assigned by the OLT for the ONU responding to the serial number request.

Figure 7:
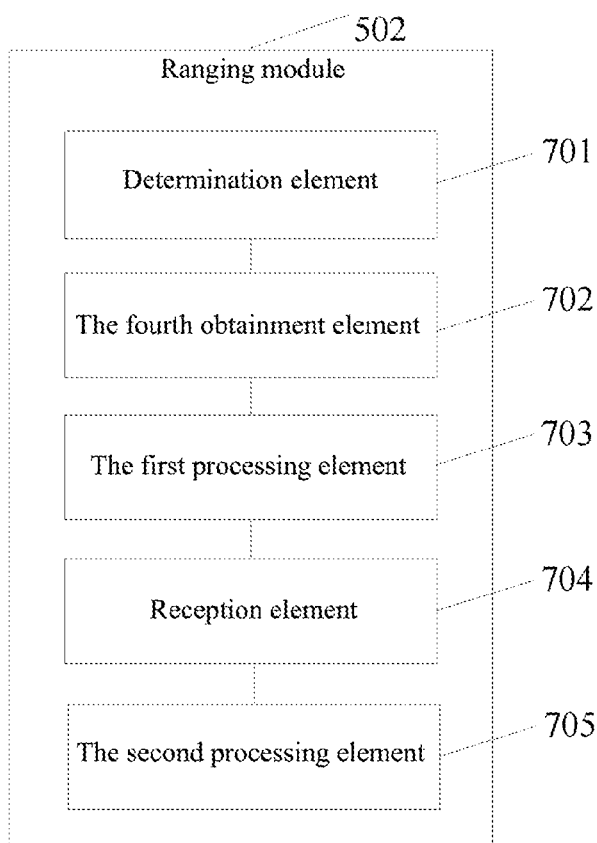
FIG. 7 is a schematic diagram of the structure of the ranging module 502 in the embodiment shown in FIG. 5.

Preferably, as shown in FIG. 7, the ranging module 502 may comprise:

a determination element 701, which is configured to: determine the required period T during performing ranging on the ONU according to the RTD;

the fourth obtainment element 702, which is configured to: obtain the open time of the quiet window according to the determined required period T during performing ranging on the ONU and a preset adjustment time $\Delta t$;

the first processing element 703, which is configured to: send a ranging request to the ONU that is in the ranging state when the ONU is in the ranging state, and open a quiet window used for performing ranging on the ONU at the same time, wherein the quiet window includes the open time of the quiet window;

a reception element 704, which is configured to: receive the ranging response within the open time of the quiet window; and the second processing element 705, which is configured to: obtain the equalization delay (EqD) of the ONU that is in the ranging state and send the EqD to the ONU that is in the ranging state.

Preferably, the determined required period T during the OLT performing ranging on the ONU is the sum of the round trip delay and one or more of the following delays including:

the pre-assigned delay when the ONU that is in the ranging state responds to the ranging request and the start time of sending the ranging response.

Figure 8:
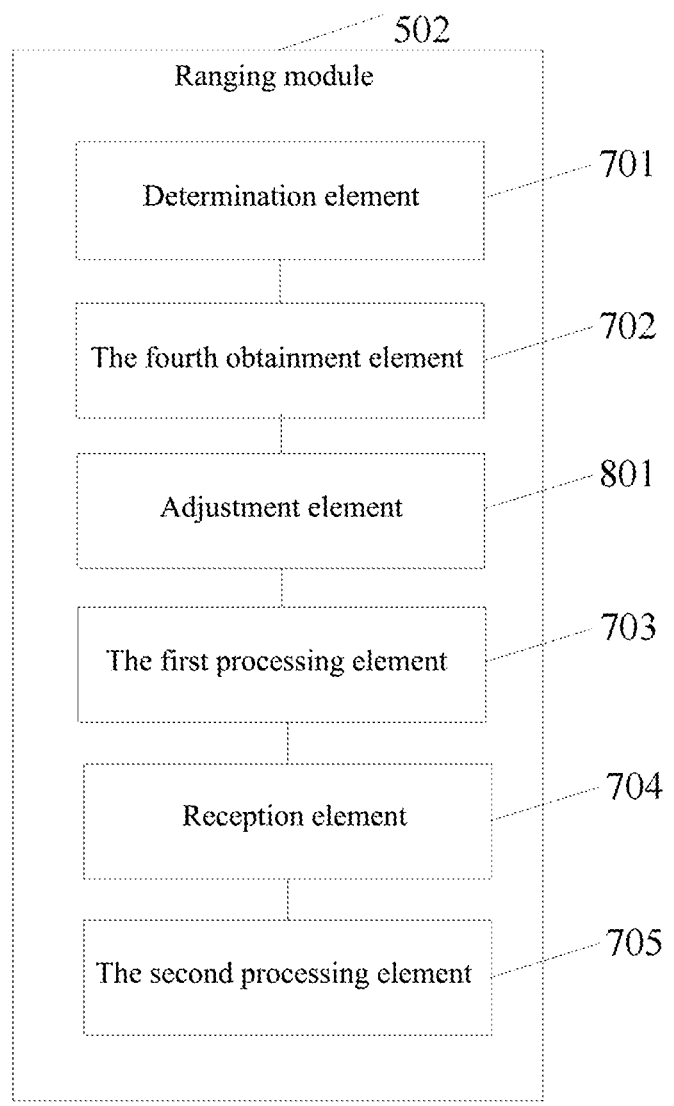
FIG. 8 is another schematic diagram of the structure of the ranging module 502 in the embodiment shown in FIG. 7.

Optionally, as shown in FIG. 8, the ranging module may further comprise:

An adjustment element 801, which is configured to: reduce the value of the adjustment time Δt when the ranging on the ONU is successful; or increase the value of the adjustment time Δt when the ranging on the ONU is failed.

One person having ordinary skill in the art will appreciate that all or part of the steps in the above embodiments could be achieved by instructing relative hardware with programs, the programs may be stored in a computer-readable storage medium, and one step or a combination of steps of the embodiments of the method will be involved when executing these programs.

Additionally, each of the function elements in the embodiments of the present invention may be implemented in a form of hardware or a form of software function modules. The integrated modules may also be stored in the computer-readable access medium when being implemented in the form of software function modules or being sold or used as independent products.

The above-mentioned storage medium may be a read-only memory, a disk or an optical disk and so on.

What is described above is only specific embodiments of the present invention, but the protection scope of the present invention is not limited to that, and the variations and substitutions of the embodiments that can be conceived easily within the technical scope disclosed in the present invention for those skill in the art shall fall into the protection scope of the present invention. So the protection scope of the present invent is subject to the protection scope of the claims.

Industrial Applicability

In the technical scheme provided by the present invention, the round trip delay between the OLT and the ONU is obtained, and a quiet window used for ranging is opened for the ONU according to the round trip delay to perform ranging on this ONU, thereby shortening the open time of the quiet window used for ranging and improving the efficiency of the upstream transmission. An existing message transmission mechanism is used to obtain the round trip delay of the round trip between the OLT and the ONU, and the implementation method is simple and convenient.

What is claimed is:

1. A method for ranging in a passive optical network, comprising:
    obtaining a Round Trip Delay (RTD) between an Optical Line Terminal (OLT) and an Optical Network Unit (ONU); and
    opening a quiet window used for the ranging for the ONU according to the RTD to perform the ranging on this ONU,
    wherein the step of opening the quiet window used for the ranging for the ONU according to the RTD to perform the ranging on this ONU comprises:
        determining a required period T during performing the ranging on the ONU according to the RTD;
        obtaining an open time of the quiet window according to the determined required period T during performing the ranging on the ONU and a preset adjustment time Δt;
        when the ONU is in a ranging state, sending a ranging request to the ONU, and opening the quiet window used for performing the ranging on the ONU simultaneously, wherein the quiet window includes the open time of the quiet window;
        receiving a ranging response within the open time of the quiet window; and
        obtaining an Equalization Delay (EqD) of the ONU that is in the ranging state and sending the EqD to the ONU that is in the ranging state.

2. The method according to claim 1, wherein the step of obtaining the RTD between the OLT and the ONU comprises:
    when the ONU is in a serial number state, sending a serial number request message to the ONU that is in the serial number state, and recording a sending time of the serial number request message;
    receiving a serial number response message sent by the ONU that is in the serial number state, the serial number response message including random delay information of the ONU, and recording a receiving time of the serial number response message; and
    obtaining the RTD of a round trip between the OLT and the ONU according to the sending time of the serial number request message, the receiving time of the serial number response message, a random delay of the ONU, and a pre-assigned delay and a start time that are preset by the OLT for the ONU responding to the serial number request.

3. The method according to claim 2, wherein the step of opening the quiet window used for the ranging for the ONU according to the RTD to perform the ranging on this ONU comprises:
    determining a required period T during performing the ranging on the ONU according to the RTD;
    obtaining an open time of the quiet window according to the determined required period T during performing the ranging on the ONU and a preset adjustment time Δt;
    when the ONU is in a ranging state, sending a ranging request to the ONU, and opening the quiet window used for performing the ranging on the ONU simultaneously, wherein the quiet window includes the open time of the quiet window;
    receiving a ranging response within the open time of the quiet window; and
    obtaining an Equalization Delay (EqD) of the ONU that is in the ranging state and sending the EqD to the ONU that is in the ranging state.

4. The method according to claim 3, wherein the determined required period T during performing ranging on the ONU is a sum of the round trip delay and one or more of following delays: a pre-assigned delay when the ONU that is in the ranging state responds to the ranging request and a start time of sending the ranging response.

5. The method according to claim 4, further comprising:
    when the ranging on the ONU is successful, reducing a value of the adjustment time Δt; when the ranging on the ONU is failed, increasing the value of the adjustment time Δt.

6. The method according to claim 1, wherein the determined required period T during performing ranging on the ONU is a sum of the round trip delay and one or more of following delays: a pre-assigned delay when the ONU that is in the ranging state responds to the ranging request and a start time of sending the ranging response.

7. The method according to claim 6, further comprising:
    when the ranging on the ONU is successful, reducing a value of the adjustment time Δt; when the ranging on the ONU is failed, increasing the value of the adjustment time Δt.

8. An apparatus for ranging in a passive optical network, comprising:
- an obtainment module, which is configured to: obtain a Round Trip Delay (RTD) between an Optical Line Terminal (OLT) and an Optical Network Unit (ONU); and
- a ranging module, which is configured to: open a quiet window used for ranging for the ONU according to the RTD to perform ranging on this ONU, wherein the ranging module comprises:
- a determination element, which is configured to: determine a required period T during performing ranging on the ONU according to the RTD;
- an obtainment element, which is configured to: obtain an open time of the quiet window according to the determined required period T during performing ranging on the ONU and a preset adjustment time Δt;
- a first processing element, which is configured to: send a ranging request to the ONU that is in a ranging state, and open the quiet window used for performing ranging on the ONU at the same time, wherein the quiet window includes the open time of the quiet window;
- a reception element, which is configured to: receive a ranging response within the open time of the quiet window; and
- a second processing element, which is configured to: obtain an Equalization Delay (EqD) of the ONU that is in the ranging state and send the EqD to the ONU that is in the ranging state.

9. The apparatus according claim 8, wherein the obtainment module comprises:
- a first obtainment element, which is configured to: send a serial number request message to the ONU that is in a serial number state when the ONU is in the serial number state, and record a sending time of the serial number request message;
- a second obtainment element, which is configured to: receive a serial number response message, including random delay information of the ONU, sent by the ONU that is in the serial number state, and record a receiving time of the serial number response message; and
- a third obtainment element, which is configured to: obtain the RTD of a round trip between the OLT and the ONU according to the sending time of the serial number request message, the receiving time of the serial number response message, a random delay of the ONU and a pre-assigned delay, and a start time that are assigned by the OLT for the ONU responding to the serial number request.

10. The apparatus according to claim 9, wherein the ranging module comprises:
- a determination element, which is configured to: determine a required period T during performing ranging on the ONU according to the RTD;
- an obtainment element, which is configured to: obtain an open time of the quiet window according to the determined required period T during performing ranging on the ONU and a preset adjustment time Δt;
- a first processing element, which is configured to: send a ranging request to the ONU that is in a ranging state, and open the quiet window used for performing ranging on the ONU at the same time, wherein the quiet window includes the open time of the quiet window;
- a reception element, which is configured to: receive a ranging response within the open time of the quiet window; and
- a second processing element, which is configured to: obtain an Equalization Delay (EqD) of the ONU that is in the ranging state and send the EqD to the ONU that is in the ranging state.

11. The apparatus according claim 10, wherein the determined required period T during performing ranging on the ONU is a sum of the round trip delay and one or more of following delays: a pre-assigned delay when the ONU that is in the ranging state responds to the ranging request and a start time of sending the ranging response.

12. The apparatus according claim 11, wherein the ranging module further comprises:
- an adjustment element, which is configured to: reduce a value of the adjustment time Δt when the ranging on the ONU is successful; increase the value of the adjustment time Δt when the ranging on the ONU is failed.

13. The apparatus according claim 8, wherein the determined required period T during performing ranging on the ONU is a sum of the round trip delay and one or more of following delays: a pre-assigned delay when the ONU that is in the ranging state responds to the ranging request and a start time of sending the ranging response.

14. The apparatus according claim 13, wherein the ranging module further comprises:
- an adjustment element, which is configured to: reduce a value of the adjustment time Δt when the ranging on the ONU is successful; increase the value of the adjustment time Δt when the ranging on the ONU is failed.

* * * * *